United States Patent
Ida

(10) Patent No.: US 6,414,466 B1
(45) Date of Patent: Jul. 2, 2002

(54) DEVICE, METHOD AND COMPUTER READABLE RECORDING MEDIUM FOR INDICATING CHARGE INFORMATION OF A BATTERY

(75) Inventor: Takashi Ida, Omiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 13 days.

(21) Appl. No.: 09/688,529

(22) Filed: Oct. 16, 2000

(30) Foreign Application Priority Data

Oct. 15, 1999 (JP) ............................................ 11-294344
Aug. 11, 2000 (JP) ....................................... 2000-245360

(51) Int. Cl.⁷ ........................ H01M 10/44; H01M 10/46
(52) U.S. Cl. ............................... 320/132; 320/DIG. 21
(58) Field of Search ................................ 320/127, 128, 320/132, 135, DIG. 18, DIG. 21; 324/425, 433; 340/635, 636; 429/61, 90

(56) References Cited

U.S. PATENT DOCUMENTS 5,307,000 A  *  4/1994  Podrazhansky et al.

* cited by examiner

*Primary Examiner*—Edward H. Tso
(74) *Attorney, Agent, or Firm*—Oblon, Spivak, McClelland, Maier & Neustadt, P.C.

(57) ABSTRACT

A state and amount of charge indication device includes a braille indicator indicating characters in braille, a key unit for selecting information to be indicated, a charge control circuit, which controls the charging of a rechargeable battery and which is used to detect the state of charge. An A/D converter is provided for measuring a charging voltage of the rechargeable battery and a central processing unit controls, based on operations by the key unit, the braille indicator. The braille indicator is used to indicate states of charge, such as "in process of charging", "completion of charging", and "rechargeable battery error", or the result of detection by the A/D converter, such as "fully charged", "half charged", or "remaining charge insufficient".

14 Claims, 8 Drawing Sheets

A EXAMPLES OF INDICATIONS OF
STATE-OF-CHARGE INFORMATION

1 EXTERNAL POWER
  SUPPLY UNCONNECTED (NON)    301

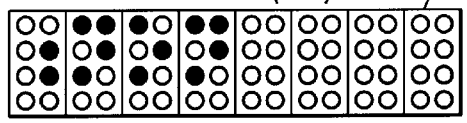

2 IN PROCESS
  OF CHARGING    (CHARGE)

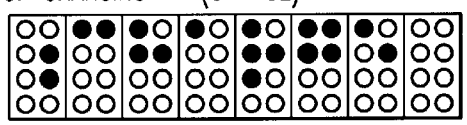

3 COMPLETION
  OF CHARGING    (END)

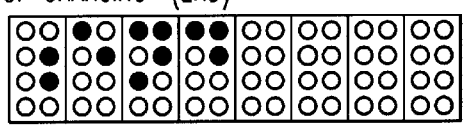

4 RECHARGEBLE
  BATTERY ERROR   (ERROR)

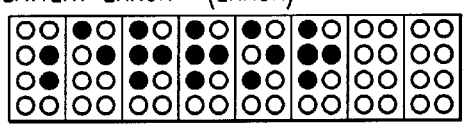

*FIG. 3a*

B EXAMPLES 1 OF INDICATIONS OF
AMOUNT-OF-CHARGE INFORMATION

1 FULLY CHARGED
  (CHARGING NOT REQUIRED)

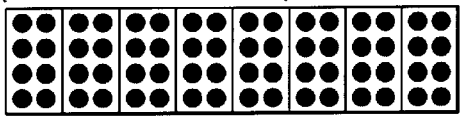

2 ALMOST HALF
  CHARGED

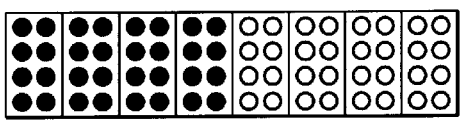

3 REMAINING CHARGE INSUFFICIENT
  (CHARGING REQUIRED)

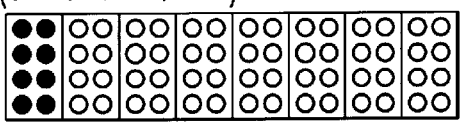

*FIG. 3b*

C EXAMPLES 2 OF INDICATIONS OF
AMOUNT-OF-CHARGE INFORMATION

1 FULLY CHARGE
  (NUMERAL: 9)

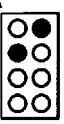

2 ALMOST HALF CHARGED
  (NUMERAL: 5)

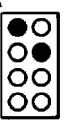

3 REMAINING CHARGE INSUFFICIENT
  (NUMERAL: 1)

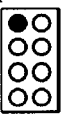

*FIG. 3c*

A RECOGNITION BY TIME IN WHICH POWER IS CONTINUOUSLY SUPPLIED

B RECOGNITION BY PERIOD (POWER-SUPPLY INTERVAL)

C RECOGNITION BY THE NUMBER OF TIMES POWER IS SUPPLIED

DEVICE, METHOD AND COMPUTER READABLE RECORDING MEDIUM FOR INDICATING CHARGE INFORMATION OF A BATTERY

BACKGROUND OF THE INVENTION

1. Field of the Invention

The present invention relates a device, method and computer program product for indicating a state of charge or remaining charge information of a battery. The device, method and computer program product may be provided in a charger for charging rechargeable batteries, such as a nickel-cadmium (Ni—Cd) and nickel-hydrogen (Ni—MH) batteries or in a charger built into an apparatus using a rechargeable battery.

2. Discussion of the Background

Conventional chargers display a state of charge or remaining charge information of a battery using a light-emitting device (LED) or a liquid crystal display (LCD). However, with such devices, since the charge information is visually displayed, such devices are not suited for visually handicapped persons. In addition, such charge information devices-are incorporated into portable devices, such as cellular phones, portable terminals, electronic calculators, etc., making use of such portable devices with respect to charge information difficult for the visually handicapped.

SUMMARY OF THE INVENTION

Accordingly, it is an object of the present invention to provide an easy to use and economically battery charge information indication device, method and computer program product for providing charge information to the visually handicapped.

The above and other objects are achieved according to the present invention by providing a novel state and amount of charge indication device, method and computer program product including an indication means for indicating the state or the amount of charge in one of braille, vibrations and sounds; an operating unit for selecting information to be indicated; a state of charge detecting means for detecting a state of charge in a rechargeable battery; an amount of charge detecting means for detecting an amount of charge in the rechargeable battery; and a control means for controlling, based on an operation using the operating unit, the indication means to indicate one of the detected state of charge and the detected amount of charge.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 3(a)–3(c) illustrate indications provided by a braille cell 301 shown in FIG. 2, according the present invention;

DETAILED DESCRIPTION OF THE PREFERRED EMBODIMENTS

Figure 1:
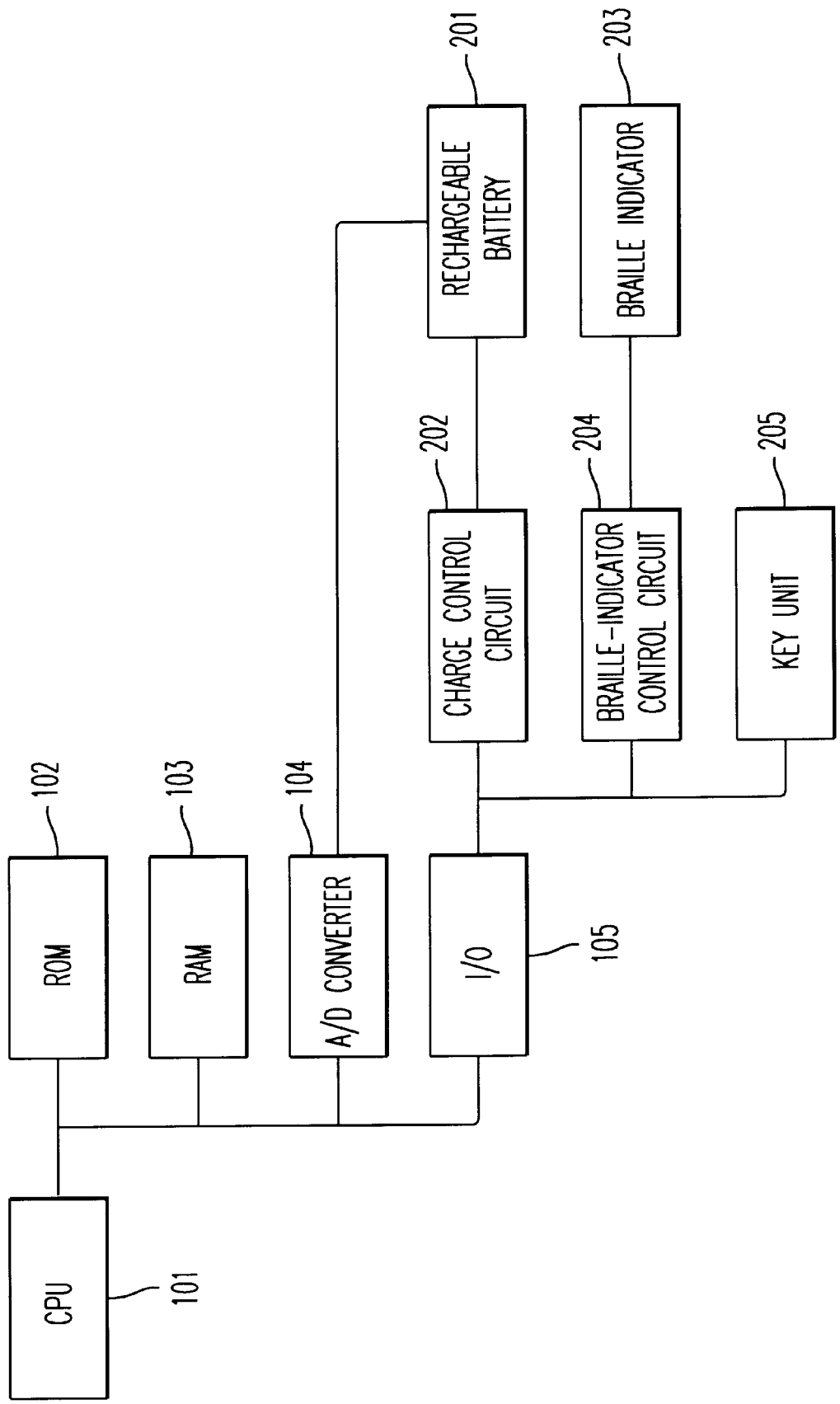
FIG. 1 is a block diagram illustrating the structure of a battery charger using a state and amount of charge indication device, according to a first embodiment of the present invention.

Referring now to the drawings, wherein like reference numerals designate identical or corresponding parts throughout the several views, and more particularly to FIGS. 1–8 thereof, wherein there are illustrated various embodiments of the present invention.

First Embodiment

A state and amount of charge indication device according to a first embodiment of the present invention is described below with reference to FIGS. 1 to 4. FIG. 1 is block diagram illustrating a charger unit built into a portable apparatus, such as a cellular phone, a portable terminal, an electronic calculator, etc., operated by a rechargeable battery, in which the state and amount of charge indication device according to the first embodiment is incorporated.

In FIG. 1, the charger unit includes a central processing unit (CPU) 101 for controlling other components, a read-only memory (ROM) 102 for storing program instructions read by the CPU 101 and various other data. A random access memory (RAM) 103 is provided and is as data storage area when a program is executed. A rechargeable battery 201, such as a nickel-cadmium battery, nickel-hydrogen battery, etc., supplies power to the device components. An analog-to-digital (A/D) converter 104 converts a voltage representing a charging voltage and current of the rechargeable battery 201 from analog into digital form. A charge control circuit 202 operates cooperatively with the CPU 101 to detect a state of charge in the rechargeable battery 201. An input/output (I/O) circuit 105 is used for inputting or outputting data and provides an interface between the CPU 101 and peripheral devices, such as a braille indicator control circuit 204, a key unit 205, a braille indicator 203, etc., as shown in FIG. 1. The braille indicator 203 provides braille characters representative of data to be provided to the visually handicapped. The charge control circuit 202 controls the start and end of charging for the rechargeable battery 201. The braille indicator control circuit 204 controls (i.e., drives) the braille indicator 203 based on data sent from the CPU 101. The key unit 205 includes a plurality of operating elements and provides a user with a data input interface function.

The state and amount of charge indication device according to the first embodiment can be applied to a charger unit built into portable apparatuses using a rechargeable battery, as described above or can be applied to a stand-alone charger for charging a rechargeable battery. In addition, the state and amount of charge indication device can be formed such that part of the unit is removably mounted on an electronic apparatus and the other part is built into the electronic apparatus. When the state and amount of charge indication device is built into an electronic apparatus, the device can be constructed so that components, such as the CPU 101, the ROM 102, the RAM 103, the A/D converter 104, the I/O circuit 105, etc., are shared with the electronic apparatus. When some components of the state and amount of charge indication device are externally provided, the braille indicator 203, the braille indicator control circuit 204, and the key unit 205 can be externally removably connected to the I/O circuit 105 via, for example, connectors and cables.

In FIG. 1, the charge control circuit 202 charges the rechargeable battery 201, and controls charging, such as the start and end of charging. The charge control circuit 202 also has a function of transmitting, to the CPU 101, information representative of charging functions, such as "in process of charging", "end of charging", "charging error", etc., via the I/O circuit 105. The A/D converter 104 is provided for measuring a amount of charge remaining of the rechargeable battery 201 and for allowing the CPU 101 to acquire the measured amount of charge remaining information. The A/D converter 104 measures an analog signal, such as a signal representative of the voltage of the rechargeable battery 201, a charging current, etc., and converts the signal from analog into digital form and transmits the converted digital data to the CPU 101. Based on information obtained from the charge control circuit 202 and/or the A/D converter 104, the CPU 101 outputs a command for indicating state of charge information or remaining charge information to the braille indicator control circuit 204. In accordance with the command, the braille indicator control circuit 204 controls (i.e., drives) the braille indicator 203. In the charger unit shown in FIG. 1, indications of the state of charge information and the remaining charge information can be switched by the user operating corresponding elements of the key unit 205.

Functions provided by the charger unit shown in FIG. 1 will now be described. In a case where the charger of FIG. 1 is built into an electronic apparatus, such as a cellular phone, a calculator, etc., an external charger performs a predetermined voltage conversion and/or an AC-to-DC conversion using an external power supply. In this case, when the external charger is connected via the charge control circuit 202 to the rechargeable battery 201 to be charged. or a predetermined operating element of the key unit 205 is activated, the charge control circuit 202 and the A/D converter 105 perform various charging operations.

Accordingly, the CPU 101 detects a state of the charging operations, such as "in process of charging", "end of charging", "charging error", the amount of charge remaining, etc. The CPU 101 then outputs an indication command to the braille indicator control circuit 204. The state of charge information or the remaining charge information is then indicated to a visually handicapped user via the braille indicator 203. The user can switch between being provided with the state of charge information and the remaining charge information via operation of the key unit 205.

Figure 2:
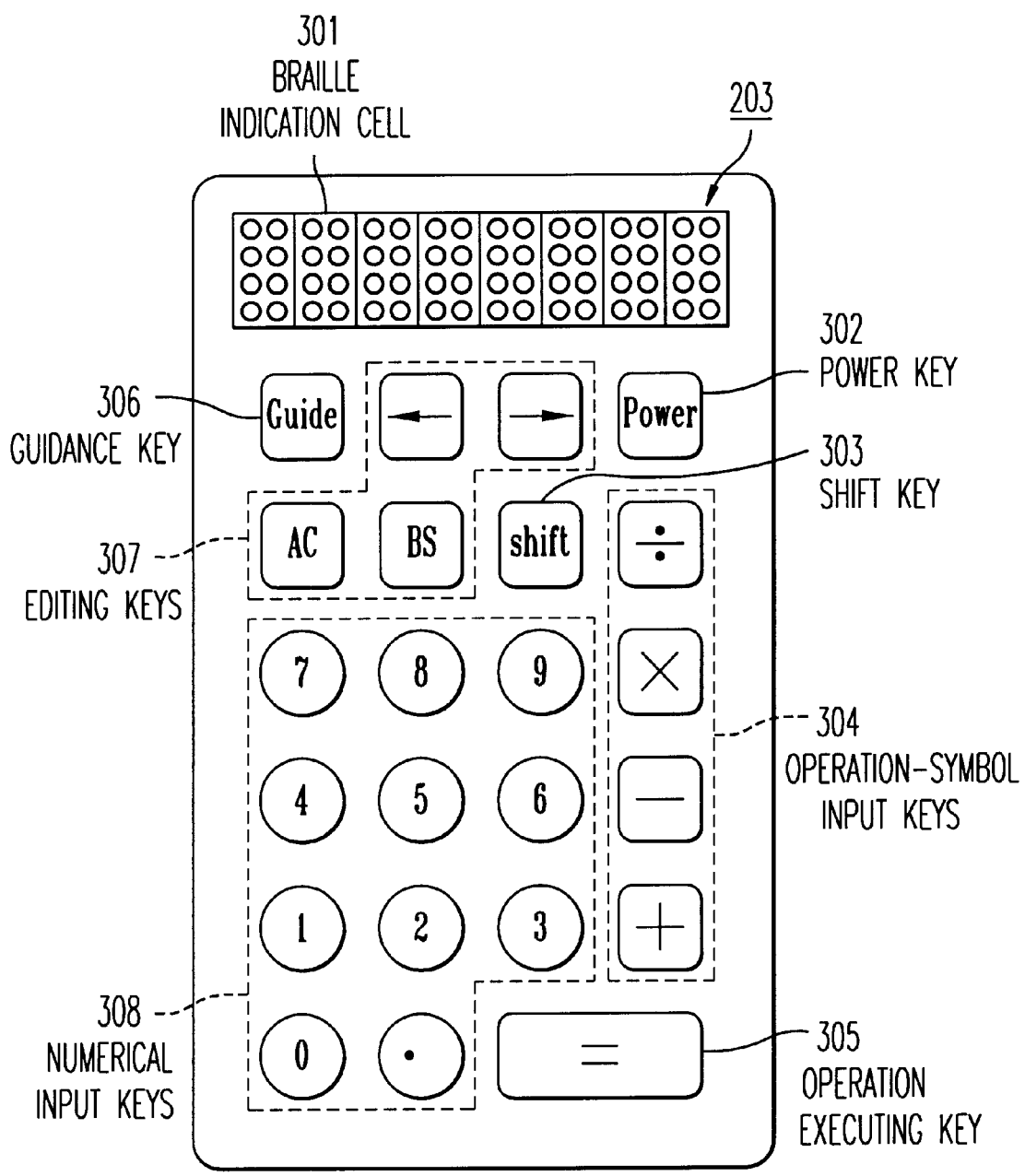
FIG. 2 is an exterior view illustrating a braille calculator, in which the charger shown in FIG. 1 is provided, according the present invention.
Figure 4:
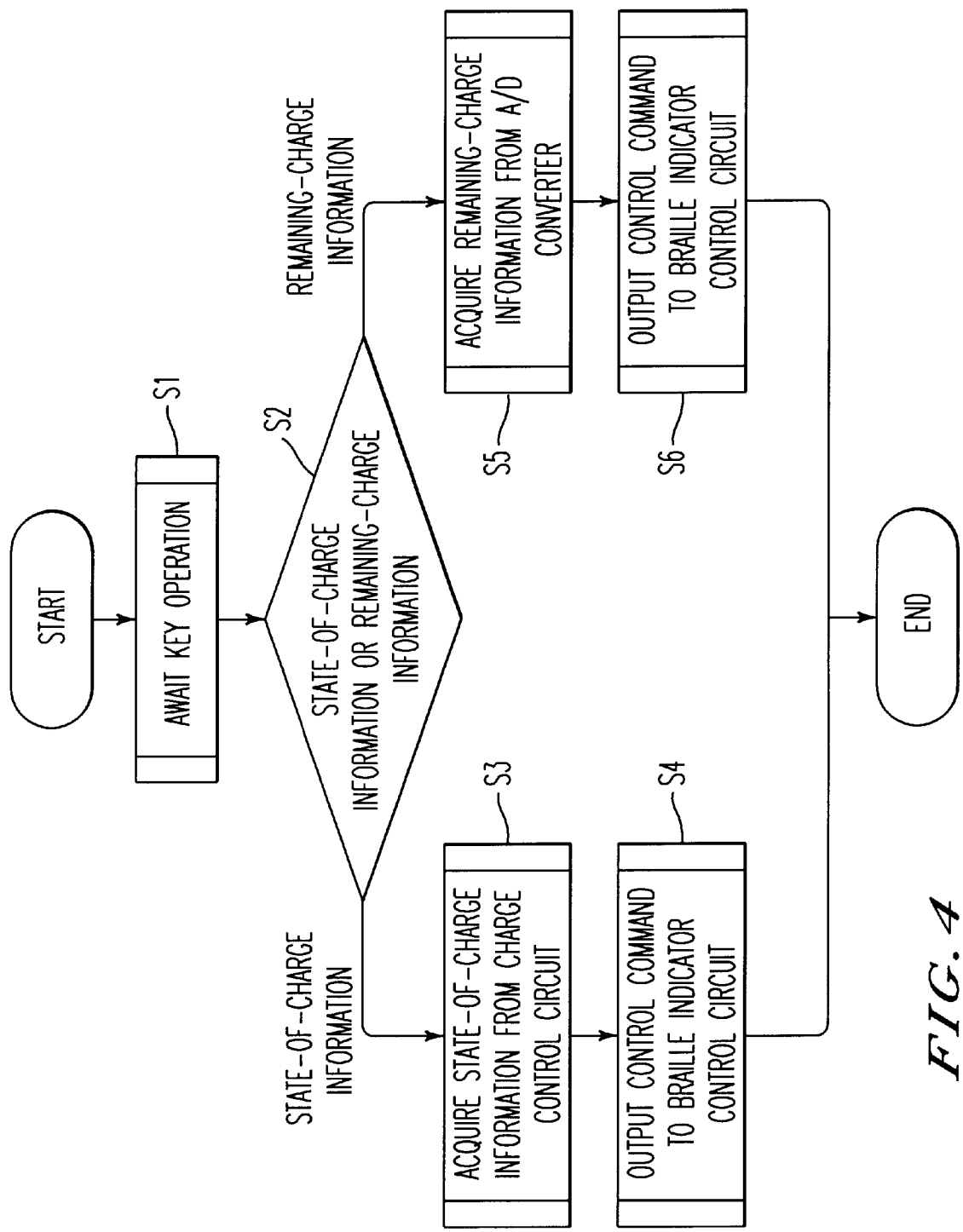
FIG. 4 is a flowchart for illustrating operations performed by the charger shown in FIG. 1, according the present invention.

A case where the charger unit shown in FIG. 1 is provided in an electronic calculator will now be described with reference to FIGS. 2 to 4. The calculator shown in FIG. 2 may be a "braille calculator" (see, e.g., Japanese Unexamined Patent Application Publication No. 2-252048 entitled "Braille Calculator for the Blind"). As shown in FIG. 2, such a calculator typically includes a braille indication cell 301 composed of eight braille indication units, which typically indicate a numerical expression, a result of an operation, etc., via braille characters. The calculator further includes a power key 302, a shift key 303 and mathematical operation keys 304, such as an addition ("+") key, a subtraction ("−") key, a multiplication (×) key, a division (÷), etc. Editing keys 307 are provided and include, for example, cursor movement keys (←) and (→), an all clear key ("AC"), a backspace key ("BS"), etc. An operation execution key 305, a guidance or help key 306 is also provided. Numerical input keys 308 are also provided and include, for example, ten numerical keys ("0" to "9"), a decimal key ("."), etc.

The calculator also provides (i) a remaining charge indication function for indicating a amount of charge remaining of the battery; (ii) a state of charge indication function for indicating a state of charge, such as "in process of charging", "completion of charging", etc.; (ii) an arithmetic function; and (iii) a guidance or help indication function for explaining the operation of each of the various functions. With the arithmetic function, the user inputs a numerical expression via the numerical input keys 308 and the operation symbol input keys 304. The input numerical expression is provided in the braille indication cell 301 and pressing of the operation execution key 305 perform the selected numerical operation. The result of the operation is then indicated in the braille indication cell 301. The guidance indication function allows the braille indication cell 301 to provide an explanation for use of various functions when the guidance indication key 306 is pressed.

Although the braille indication cell 301, for example, is provided with only eight digits for indicating characters, a numerical expression having more than eight characters can still be input via the cursor movement keys (←) and (→). With these keys the cursor can be moved, for example, either right or left within the braille indication cell 301. In this way, part of the input numerical expression indicated by the braille indication cell 301 may be shifted right or left (i.e., the input numerical expression is scrolled), allowing entry of numerical expressions having more than eight characters. When the input numerical expression includes an error, the user can correct the error using the all clear key "AC" or the backspace key "BS" of the editing keys 307. When the operation execution key 305 is pressed, the input numerical expression is replaced with the result of the executed operation.

When the result of an executed operation is longer than eight characters, the part of the result that exceeds the eight characters, can be indicated in the braille indication cell 301 via the cursor movement keys (←) and (→). By using the shift key 303, each key function may be expanded to include other functions, which are selected pressing a key together with the shift key 303. In the way expanded functions, such as high-level numerical expressions and operations, etc., can be provided.

The remaining charge indication function and the state of charge indication function of the braille calculator shown in FIG. 2 will now be described. The braille calculator shown in FIG. 2 includes the rechargeable battery 201 and the charge control circuit 202. By connecting an external power supply to the braille calculator, the rechargeable battery 201 can be charged. As described above, the braille indicator 203 (corresponding to the braille indication cell 301) is built into the braille calculator. By using the braille indicator 203, state of charge information or remaining charge information can be indicated to the visually handicapped.

With the above construction, when a user needs to know the state of charge information or the remaining charge information, the user selects either the state of charge information or the remaining charge information by performing a predetermined operation with the key unit 205 (e.g., coupled to one or more of the various keys of the calculator). The selected information is then indicated in the braille indication cell 301. The types of the state of charge information, for example, consist of (i) "external power supply unconnected", (ii) "in process of charging", (iii) "completion of charging", and (iv) "rechargeable battery error". The types of the state of charge information are respectively indicated in braille via braille indication cell 301, for example, as (i) "NON", (ii) "CHARGE", (iii) "END", and (iv) "ERROR". This enables the user to appropriately recognize the state of charge.

FIGS. 3(*a*)–3(*c*) illustrate indications provided by a braille cell 301 shown in FIG. 2, according the present invention. In FIGS. 3(*a*)–3(*c*), a blackened in circle represent a braille pin protruding from the indicating surface and a blank circle represents a braille character retracted from the indicating surface.

FIG. 3(*a*) shows the four exemplary states that are indicated by the braille indication cell 301. In FIG. 3(*a*) the four states of charge, indicated by the braille indication cell 301 include (i) "NON" representing "external power supply unconnected", (ii) "CHARGE" representing "in process of charging", (iii) "END" representing "completion of charging", and (iv) "ERROR" representing "rechargeable battery error".

As shown in FIG. 3(*b*), the amount of charge remaining indication function can be graphically indicated using the braille indication cell 301. In this case, the eight characters can be used to as a bar graph representing the amount of charge remaining, for example. Accordingly, in FIG. 3(*b*), the braille indication cell 301 indicates (i) "filly charged" (i.e., charging not required) in which all the braille pins of the eight braille indication units are protruding, (ii) "almost half charged" in which the left half braille pins are protruding and the right half the braille pins are retracted and (iii) "remaining charge insufficient" (i.e., charging required) in which all the braille pins of the left-most braille indication unit are protruding and all the braille pins of the other braille indication units are retracted.

Another exemplary way to indicate the amount of charge remaining is shown in FIG. 3(*c*), wherein the amount of charge remaining is indicated by numerals between zero an nine. In FIG. 3(*c*), the three states of the amount of charge remaining are indicated in the braille indication cell 301 as (i) "fully charged" (e.g., represented as numeral 9), (ii) "almost half charged" (e.g., represented as numeral 5), and (iii) "remaining charge insufficient" (e.g., represented as numeral 1). In this case, only one braille indication unit needs to be built into the calculator and the amount of charge remaining can be indicated, advantageously simplifying the device structure.

Although, FIGS. 3(*b*) and 3(*c*) show only three different states of an amount of charge remaining, other states representing intermediate values can be additionally indicated, as will be appreciated by those skilled in the relevant art(s).

The operation of the CPU 101, which relates to control of the charger unit described with respect to FIGS. 1 and 2, will now be described with reference to the flowchart of FIG. 4. In FIG. 4, in step S1, a program executed by the CPU 101, which relates to control of the charger unit, waits for the user to operate the key unit 205. In step S2, when the user operates the key unit 205, the CPU 101 determines in accordance with the result of the operation whether either "state of charge information" or "remaining charge information" should be indicated.

In step S3, if the CPU 101 has determined that the operation with the key unit 205 requires the "state of charge information", the CPU 101 uses the charge control circuit 202 to acquire the present state of charge. In step S4, based on the obtained state of charge, the CPU 101 outputs, to the braille indicator control circuit 204, a control command for indicating the obtained state of charge via the braille indicator 203. If the CPU 101 has determined in step S2 that the operation with the key unit 205 requires the "remaining charge information", in step S5, the CPU 101 acquires the present amount of charge remaining (e.g., a voltage) from the A/D converter 104. In step S6, based on the remaining amount obtained in step S5, the CPU 101 outputs, to the braille indicator control circuit 204, a command for indicating the remaining charge information via the braille indicator 203.

The remaining charge information is indicated by, for example, allowing the ratio of the present charging voltage to a charging voltage in the fully charged state to correspond to the number of braille indication units among the eight braille indication units of the braille indication cell 301, as shown in FIG. 3(*b*). This function may also be accomplished by allowing the ratio to correspond to a numeral indicated by one braille indication unit, as shown in FIG. 3(*c*). At the same time, by considering the value of the charging current supplied to the rechargeable battery and information on the temperature of the rechargeable battery, the remaining charge information can be corrected.

When steps S4 or S6 are completed, the CPU 101 proceeds back to step S1 in accordance with a predetermined operation via the key unit 205 or via a lapse of a predetermined amount of time. The CPU 101 then waits for the key unit 205 to be operated again.

Second Embodiment

Figure 5:
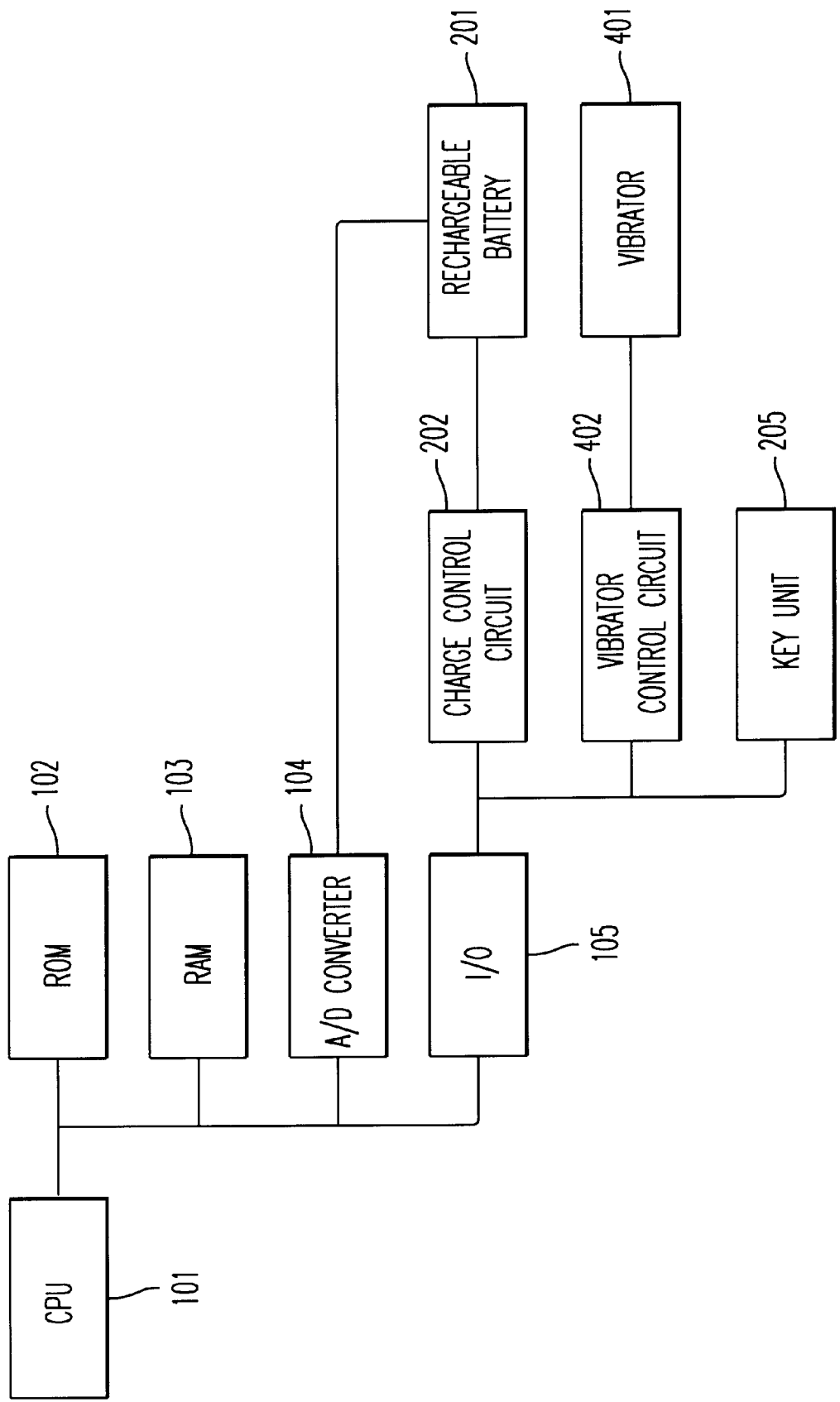
FIG. 5 is a block diagram illustrating the structure of a battery charger using a state and amount of charge indication device, according to a second embodiment of the present invention.

A state and amount of charge indication device according to a second embodiment of the present invention will now be described with reference to FIGS. 5 to 7. FIG. 5 is a block diagram illustrating a charger unit built into a portable apparatus, such as a cellular phone, a portable terminal, an electronic calculator, etc., operating via a rechargeable battery, in which the state and amount of charge indication device according to the second embodiment is provided.

In FIG. 5, the charger unit operates in a similar manner as the charger unit of FIG. 1, but is constructed by providing a vibrator 401 and a vibrator control circuit 402 instead of the braille indicator 203 and the braille indicator control circuit 204 of the charger unit of FIG. 1. The vibrator control circuit 402 controls the operation of the vibrator 401. However, the vibrator 401 and the vibrator control circuit 402 of FIG. 5 may be used along with the braille indicator 203 and the braille indicator control circuit 204 of FIG. 1.

In the vibrator 401, a weight can be provided on, for example, the driving shaft of a motor so that a center of gravity thereof is eccentrically positioned. With this structure, by rotating the drive shaft of the motor, the center of gravity of the weight is moved around the drive shaft, whereby a vibration is generated.

In accordance with a command for indicating state of charge information or remaining charge information output from a CPU 101, the vibrator control circuit 402 controls (i.e., drives) the vibrator 401. Specifically, the vibrator control circuit 402 switches on and off the supply of power to the vibrator 401 in a predetermined manner. In this way, the vibrator 401 may be made to continuously vibrate, vibrate with a repetitive period, etc.

As previously noted, the charger of FIG. 5 operates in a similar manner as the charger of FIG. 1. However, the way the state of charge information or remaining charge information is indicated via the charger of FIG. 5 will now be described, with reference to FIGS. 6-7.

Figure 6:
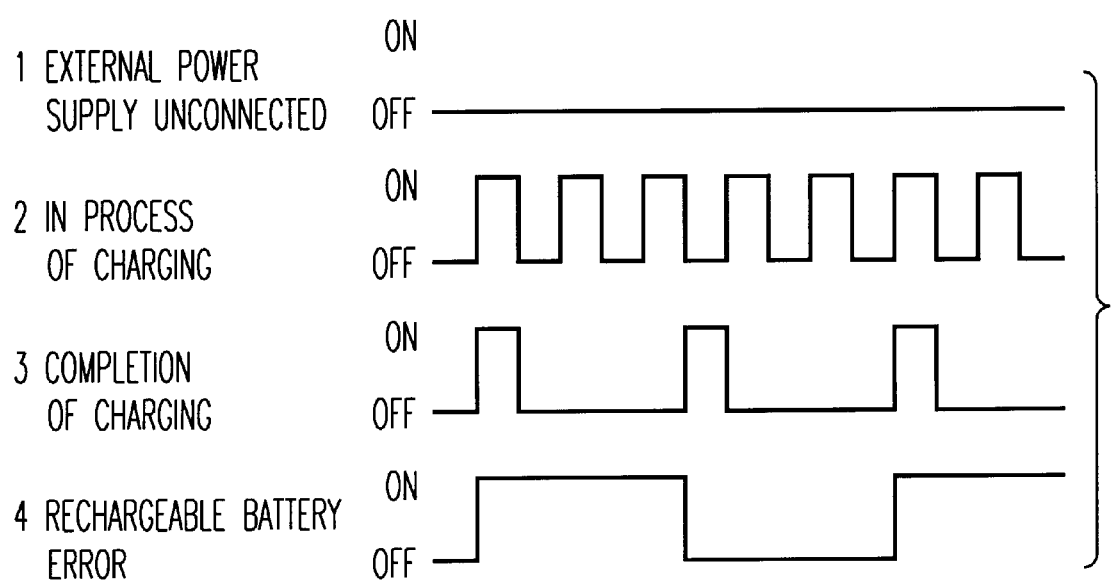
FIG. 6 is a timing diagram for illustrating state of charge indications via a vibrator or a sound source, according to second and third embodiments of the present invention.

Accordingly, FIGS. 6 and 7 show controls on the supply of power to the vibrator 401 via the vibrator control circuit 402 for indicating the state of charge information or remaining charge information. Therefore, when the user needs to know the state of charge information or the remaining charge information, the user selects either the state of charge information or the remaining charge information by performing a predetermined operation with the key unit 205. In this way, the selected information can be provided via a predetermined vibration pattern.

As previously discussed, the types of the state of charge information, for example, include (i) "external power supply unconnected", (ii) "in process of charging", (iii) "completion of charging" and (iv) "rechargeable battery error". Based on these four states of charge, the vibrator control circuit 402 controls the supply of power to the vibrator 401, such that (i) the vibrator 401 is controlled not to vibrate, (ii) the vibrator 401 is controlled to vibrate for short time pulses having fast repetition periods, (iii) the vibrator 401 is controlled to vibrate for short time pulses having slow repetition periods and (iii) the vibrator 401 is controlled to vibrate for long time pulses having slow repetition periods, as shown in FIG. 6.

Figure 7A:
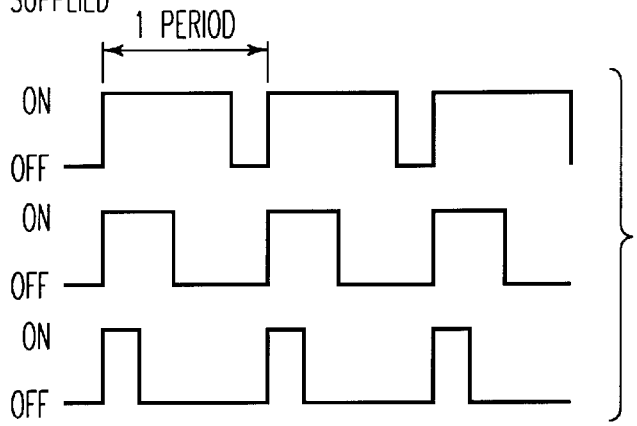
FIGS. 7(a)–7(c) are timing diagrams for illustrating amount of charge remaining indications via a vibrator or a sound source, according to second and third embodiments of the present invention.
Figure 7B:
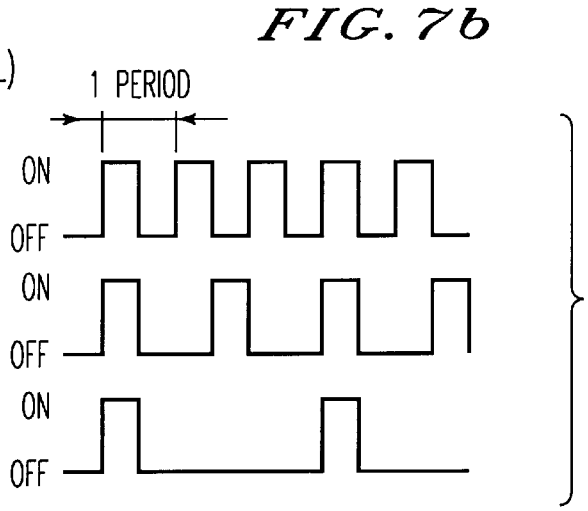
Figure 7C:
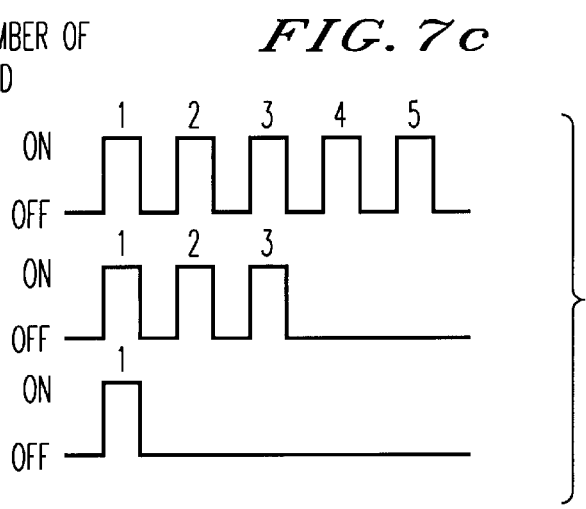

Examples of controlling the supply of power to the vibrator 401 via the vibrator control circuit 402 for indicating remaining charge information are shown in FIGS. 7(a) –7(c). In FIG. 7(a), the vibrator 401 repetitively vibrates in equal periods, and the amount of charge remaining is provided by gradually changing, in accordance with the amount of charge remaining, the length of time for which the vibrator 401 vibrates repetitively. FIG. 7(a) also shows that the vibrator 401 is controlled to vibrate longer when the rechargeable battery is fully charged and to vibrate shorter as the amount of charge remaining decreases.

In FIG. 7(b), the vibrator 401 vibrates with pulse patterns having a same length, and the amount of charge remaining is provided by gradually changing each period between the pulses in accordance with the amount of charge remaining. FIG. 7(b) also shows that each period in which the vibrator 401 vibrates repetitively is set to be shorter when the rechargeable battery is fully charged and is set to be longer as the amount of charge remaining decreases.

In FIG. 7(c), the vibrator 401 vibrates with in predetermined pulse patterns, and the amount of charge remaining is provided by changing the number of pulses according to the amount of charge remaining. FIG. 7(c) also shows that the number of pulses is increased when the rechargeable battery is fully charged and the number of pulses is reduced as the amount of charge remaining decreases. Although FIG. 7 only shows three different remaining amounts of charge for exemplary purposes, other states representing intermediate values can be additionally provided, as will be appreciated by those skilled in the relevant art(s).

Third Embodiment

Figure 8:
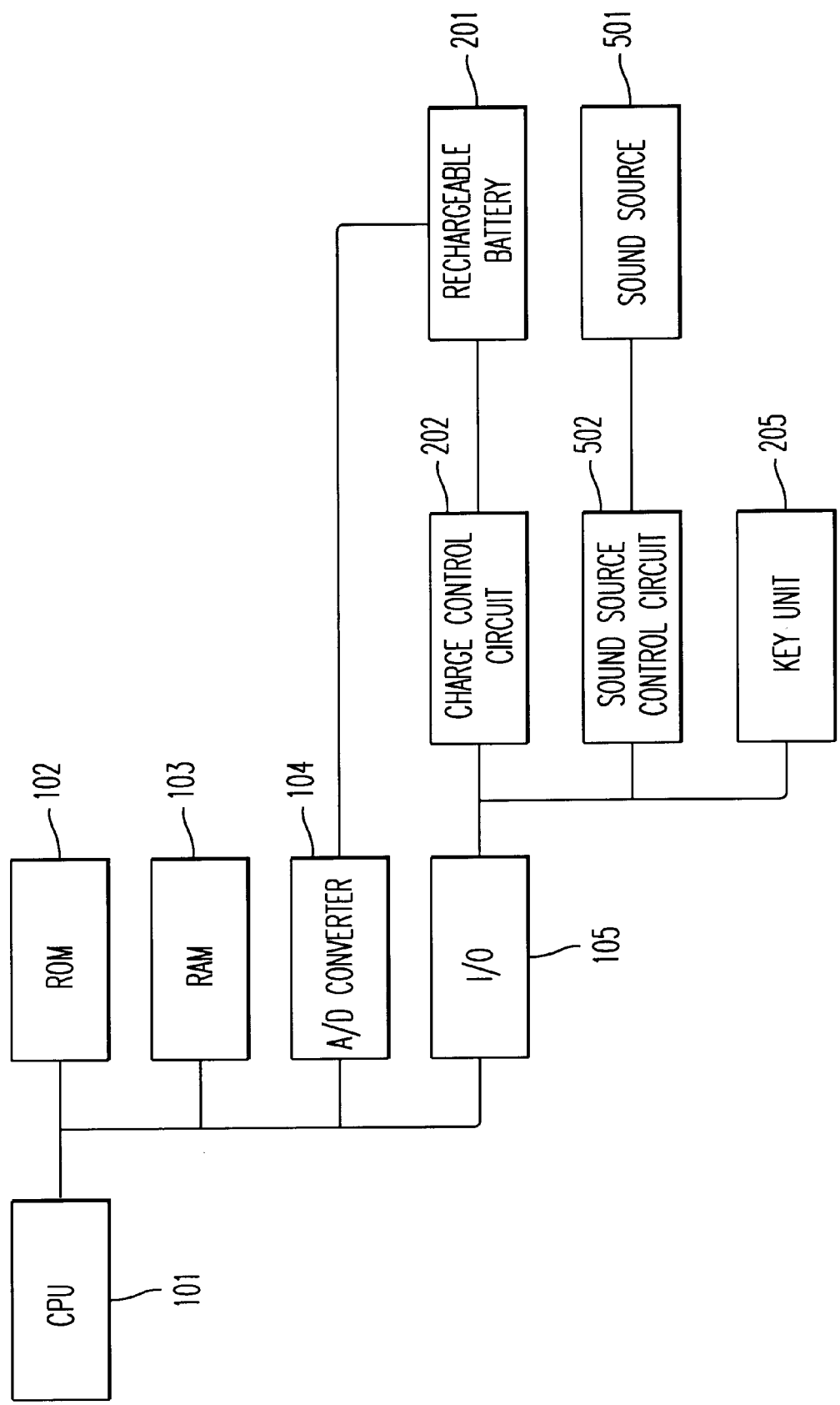
FIG. 8 is a block diagram illustrating the structure of a battery charger using a state and amount of charge indication device, according to a third embodiment of the present invention.

A state and amount of charge indication device according to a third embodiment of the present invention will now be described with reference to FIG. 8. FIG. 8 is a block diagram illustrating a charger unit built into a portable apparatus, such as a cellular phone, a portable terminal, an electronic calculator, etc., operating via a rechargeable battery, in which the state and amount of charge indication device according to the third embodiment is provided.

In FIG. 8, the charger unit operates in a similar manner as the charger units of FIGS. 1 and 5, but is constructed by providing a sound source 501 and a sound source control circuit 502 instead of the respective other devices of FIGS. 1 and 5. The vibrator control circuit 402 controls the operation of the vibrator 401. However, the sound source 501 and the sound source control circuit 502 of FIG. 8 may be used along with the respective other devices of FIGS. 1 and/or 5.

As the sound source 501, for example, a buzzer that continuously buzzes when being supplied with power can be used. The supply of power to the sound source 501 by the sound control circuit 502 is controlled in similar manner as the control of the vibrator 401 via the vibrator control circuit 402. Accordingly, the indication of the state of charge information and the remaining charge information is performed as previously described with respect to FIGS. 7(a) –7(c), except that the timing signals therein correspond to sound pulses rather then vibration pulses.

Thus, according to the present invention, by using a braille indicator, battery charge state and remaining charge information is advantageously provided to the visually handicapped via a simple and easy to use device, method and computer program product. In addition, according to the present invention, such information advantageously can also be provided via vibration patterns, and sound patterns. By combining these forms of information transmission, the battery charge information advantageously is provided to the visually handicapped via both tactile and auditory cues. This invention thus advantageously enables the visually handicapped to charge a rechargeable battery at an appropriate time and to recognize completion of a charging operation.

The mechanisms and processes set forth in the present description may be implemented using one or more conventional general purpose microprocessors programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s). However, as will be readily apparent to those skilled in the art, the present invention also may be implemented by the preparation of application-specific integrated circuits or by interconnecting an appropriate network of conventional component circuits.

The present invention thus also includes a computer-based product which may be hosted on a storage medium and include instructions which can be used to program a microprocessor to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

The present invention claims priority and contains subject matter related to Japanese Patent Application Nos. 11-294344 filed on Oct. 15, 1999 and 2000-245360, filed on Aug. 11, 2000, and the entire contents of both of which are incorporated by reference herein.

What is claimed as new and is desired to be secured by Letters Patent of the United States is:

1. A state and amount of charge indication device, comprising:
   an indication means for indicating the state or the amount of charge in one of braille, vibrations and sounds;
   an operating unit for selecting information to be indicated;
   a state of charge detecting means for detecting a state of charge in a rechargeable battery;
   an amount of charge detecting means for detecting an amount of charge in said rechargeable battery; and
   a control means for controlling, based on an operation using said operating unit, said indication means to indicate one of the detected state of charge and the detected amount of charge.

2. The device of claim 1, wherein said indication means comprises a braille indication means including a plurality of braille indication units, each braille indication unit indicating a braille character, and
   the detected amount of charge is indicated by the number of braille indication units set to be in a first indication mode and the number of braille indication units set to be in a second indication mode different from said first indication mode.

3. The device of claim 1, wherein said indication means comprises a braille indication means including a braille indication unit for indicating a braille character, and
   said braille indication means indicates the detected amount of charge in the form of a braille numeral.

4. The device of claim 1, wherein said indication means indicates the detected state of charge as one of at least four types of indications indicating that an external power supply is unconnected, that said rechargeable battery is in process of charging, that the charging of said rechargeable battery is completed, and that said rechargeable battery is malfunctioning.

5. The device of claim 1, wherein said indication means comprises a vibrator, and said control means controls said vibrator to vibrate in a pattern representing one of the detected state of charge and the detected amount of charge.

6. The device of claim 1, wherein said indication means comprises a sound source, and
   said control means controls said sound source to generate sounds representing one of the detected state of charge and the detected amount of charge.

7. The device of claim 1, wherein said state and amount of charge indication device is integrated into an electronic braille calculator.

8. A state and amount of charge indication method, comprising:
   indicating the state and the amount of charge in one of braille, vibrations and sounds via an indication means;
   selecting information to be indicated via an operating unit;
   detecting a state of charge in a rechargeable battery via a state of charge detecting means;
   detecting an amount of charge in said rechargeable battery via an amount of charge detecting means; and
   controlling, via a control means, based on an operation using said operating unit, said indication means to indicate one of the detected state of charge and the detected amount of charge.

9. The method of claim 8, wherein the step of indicating the state and the amount of charge comprises indicating the state and the amount of charge in braille via a braille indication means including a plurality of braille indication units, each braille indication unit indicating a braille character, and
   indicating the detected amount of charge by the number of braille indication units set to be in a first indication mode and the number of braille indication units set to be in a second indication mode different from said first indication mode.

10. The method of claim 8, wherein the step of indicating the state and the amount of charge comprises indicating the state and the amount of charge in braille via a braille indication means including a braille indication unit for indicating a braille character, and
    indicating the detected amount of charge in the form of a braille numeral via said braille indication means.

11. The method of claim 8, wherein the step of indicating the state and the amount of charge comprises indicating the detected state of charge as one of at least four types of indications indicating that an external power supply is unconnected, that said rechargeable battery is in process of charging, that the charging of said rechargeable battery is completed, and that said rechargeable battery is malfunctioning.

12. The method of claim 8, wherein the step of indicating the state and the amount of charge comprises indicating the state and the amount of charge with vibration via a vibrator, and
    controlling, via said control means, said vibrator to vibrate in a pattern representing one of the detected state of charge and the detected amount of charge.

13. The method of claim 8, wherein the step of indicating the state and the amount of charge comprises indicating the state and the amount of charge with sound via a sound source, and
    controlling, via said control means, said sound source to generate sounds representing one of the detected state of charge and the detected amount of charge.

14. A computer program product including a computer program configured to perform the steps recited in anyone of claims 8–13.

* * * * *